R. H. HARRISON.
Churn.
No. 10,690.
Patented March 28, 1854.
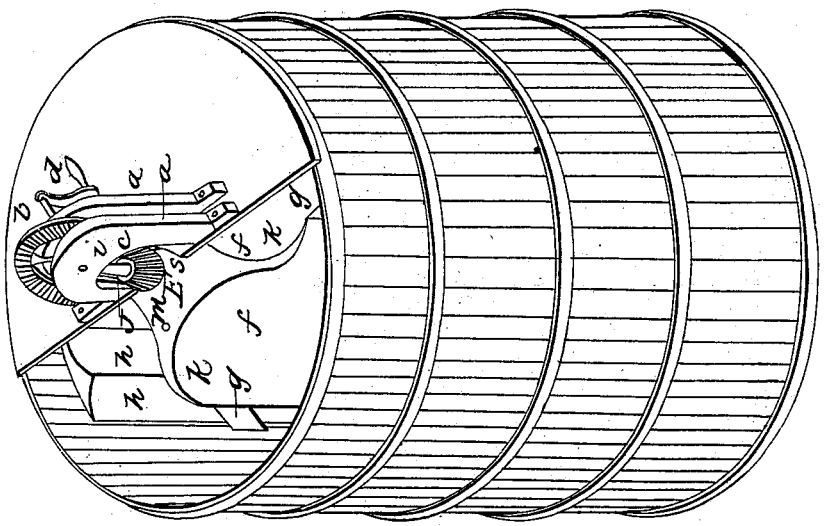
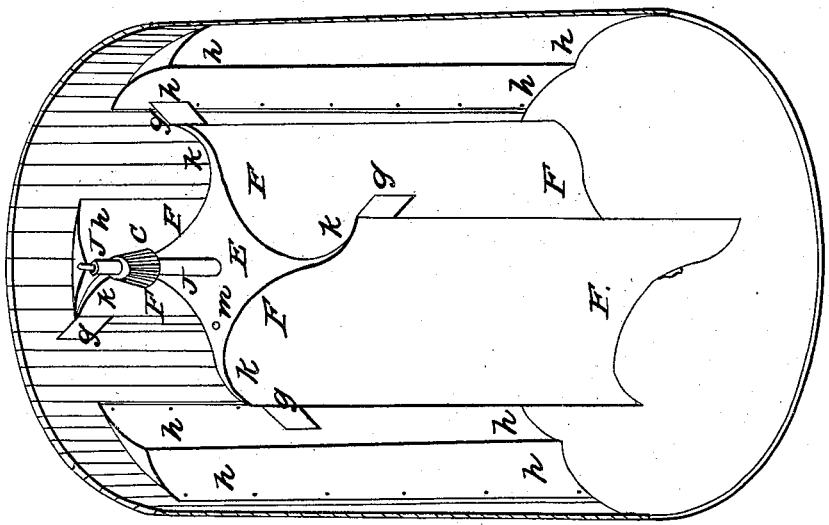

UNITED STATES PATENT OFFICE.

ROBERT H. HARRISON, OF WASHINGTON, DISTRICT OF COLUMBIA, ASSIGNOR TO R. H. HARRISON AND JNO. S. GALLAHER, JR.

CHURN.

Specification of Letters Patent No. 10,690, dated March 28, 1854.

*To all whom it may concern:*

Be it known that I, ROBERT H. HARRISON, of Washington, in the District of Columbia, have invented and made certain new and useful Improvements in Churns; and I do hereby declare that the following is a full, clear, and exact description of the method of construction and mode of operating the same, reference being had to the accompanying drawings, and making a part of this specification, in which—

Figure 1 is a view of the churn complete, $a$, $a$, $i$ being the standards and bearings, $b$ the driving wheel, $c$ the gear wheel, $d$ the handle, E the dasher, $f$, $f$, $f$, the concaves of the dasher, $g$, $g$, $g$, $g$ the wing flanges, $h$, $h$, $h$, $h$ the double concave cleats or side gatherers, J J the spindle or dasher shaft, K, K, K, K the deflective radial chambers, $m$ the hole or opening for the water. Fig. 2 is a sectional view of the churn vessel, showing the side double concave cleats or gatherers $h$, $h$, $h$, $h$. The other letters give same indication as in Fig. 1.

To enable others to be skilled in the use and application of my invention and improvements, I will proceed to describe the construction and operation thereof, the nature and principles of which consist in using any suitable vessel of the usual form of vertical churns, and having bearings or standards $a$, $a$, $i$, Fig. 1, with which are connected a master or driving wheel $b$, and a bevel gear wheel $c$, geared together and operated by a winch handle $d$, the said wheels and bearings attached to and working on one half of the top or cover of the churn. Attached to the gear wheel $c$, through the washer E, is a vertical shaft or spindle J, J, the top end working in the bearing or standard $a$, $i$, and the lower end working in the bottom of the churn. Attached permanently to the spindle or shaft is the reservoir dasher E, of the form represented in full in Fig. 2. This dasher may be designated a concavo-convex rotary reservoir dasher having hollow, deflective, or curved radial chambers, K, K, K, K, and direct radial flanges or wings $g$, $g$, $g$, $g$. This reservoir dasher E, has an opening or hole for the admission of cold or warm water in the process of churning. Around the interior circumference of the churn vessel is attached permanent or detachable double concave vertically arranged cleats or butter gatherers $h$, $h$, $h$, $h$, of tin, and capable of holding water. The further purpose of these cleats will be given hereafter more in full.

The operation of my improved churn, which I term the hydrothermal churn, is as follows: In the preparation for making butter, the churn vessel is scalded and properly prepared for the reception of the milk or cream, after which hot water is poured into the hole $m$ through a funnel, which is withdrawn after the dasher is filled with water, a cork or stopper being inserted in the hole $m$. This being done, the cream or milk being at hand, is poured into the churn vessel, and the top put on, after which the churning may commence by turning it at a moderately rapid rate the dasher E by means of the handle $d$. This being continued from 3 to 5 minutes, is all that is required to produce a perfect separation of the oleaginous matter from the caseous or serous principle, which is indicated by the appearance of the inspissated unctuous particles. These particles are not spontaneously accumulated in concrete mass, but by the aid of cold water substituted in lieu of the warm water, which is withdrawn from the dasher by detaching the dasher from the churn vessel, the concave gatherers F, F, F, F, and $h$, $h$, $h$, $h$ augmenting the concretion and forming the mass of butter without requiring much, if any, additional agency, thus puroducing in a very short and in a less space of time a more superior quality and a greater quantity of butter than can be produced by any other process or system of churning, all of which I have practically tested within the past one or two years. This is a most important feature of my improvements, and another great desideratum is that fresh or new milk can be used, and butter of a superior quality can be made therefrom in a very brief space of time, which result I believe has never heretofore been accomplished.

The principle apparently pertaining to my system of churning is as follows: An equable, uniform and certain degree of temperature being essential in the disintegration of the oily and serous properties of milk and cream, it becomes necessary to attain this desideratum in some certain methodical way, which I have accomplished, as shown, by a series of actual experiments through my improvements, embracing a vertically arranged reservoir dasher E, constructed of the form represented by E, in Figs. 1, 2, having hollow curved or deflecting radial chambers or apartments k, k, k, k, and flanges or wings g, g, g, g. The utility of these chambers, is to distribute through the volume of milk or cream a more general degree of temperature, which diffused temperature, together with the friction produced by the succession of eddies, caused by the concave and convaxo-convex chambers and gatherers h, h, h, h, k, k, k, k, change very rapidly the nature of the milk or cream, causing a rapid separation of the oleaginous and serous components. Further, in explanation of the operation of my churn I will remark that by a close examination of the principles of the dasher construction and side concave gatherers it will be perceived that the volume of milk or cream is rapidly agitated and made to move in a succession of eddies, caused by the striking of the cream or milk against the concaves of the dasher and gatherers. The rapid revolution of the dasher, together with the increased temperature of the cream, rapidly transforms the nature thereof, thus speedily separating the serum from the unctious particles. Again, the substitution of the cold water for the warm causes the more rapid solidification of the mass of butter in the same manner that a suddenly reduced temperature condenses or congeals water, and thus in the production of butter in extremely warm weather, should the cream attain too high a degree of temperature, which is calculated to induce cause coagulation, cold water or pounded ice is put into the dasher, and thus in hot weather the desired result is brought about with certainty and with little or no difficulty. If necessary the side double concaves h, h, h, h, may be also used as reservoirs for cold water or hot water when required, thus enabling the operator to attain a more uniformly diffused temperature throughout the volume of milk or cream.

The flanges or wings g, g, g, g, Fig. 2, are designed to act as coolers or fans, they producing a slight suction draft of cool air, which being drawn into the interior of the churn, through the air vent s, in the top of the churn, around the spindle, and which cool draft of air tends to reduce the temperature of the reservoirs if too great and to disseminate the heat thereof, moreover the surface of the volume of cream or milk. But it must be borne in mind that there is no primary atmospheric principle involved in the construction and operation of my churn and dasher.

Having given the detail of construction, the principles involved in my improved churn, and the results thereof, it is deemed unnecessary to dwell upon the well known mode of working and the final preparation of butter, and believing the foregoing description sufficiently intelligible, what I claim as new and original with myself and desire to secure by Letters Patent of the United States is as follows:

1. I claim the construction of a churn vessel with double concave side gatherers or water reservoirs h, h, h, h, which may be used for cold water, ice, or warm water, as described, and shown in Figs. 1, 2.

2. I claim the construction of a churn, reservoir dasher E having curved, or deflective radial chambers of a concavo-convex form k, k, k, k, with direct radial wings or flanges g, g, g, g, Figs. 1, 2, and the using the same combined with the double concave gatherers h, h, h, h, Figs. 1, 2.

3. I claim also the double application of warm and cold water, or ice, in combination with the dasher E, and the double concave gatherers h, h, h, h, substantially as set forth.

I do not however, claim the application of hot, or cold water solely in the process of butter making, as the same have been employed separately, or distinctly heretofore as is well known.

ROBERT H. HARRISON.

Witnesses:
C. H. HARRISON,
JOHN S. GALLAHER, Jr.